United States Patent [19]

McMahan et al.

[11] Patent Number: 5,337,269
[45] Date of Patent: Aug. 9, 1994

[54] CARRY SKIP ADDER WITH INDEPENDENT CARRY-IN AND CARRY SKIP PATHS

[75] Inventors: Steven C. McMahan, Richardson; Lawrence H. Hudepohl, Plano, both of Tex.

[73] Assignee: Cyrix Corporation, Richardson, Tex.

[21] Appl. No.: 27,504

[22] Filed: Mar. 5, 1993

[51] Int. Cl.⁵ .................................................. G06F 7/50
[52] U.S. Cl. .................................... 364/787; 364/786
[58] Field of Search ........................ 364/784, 786, 787

[56] References Cited

U.S. PATENT DOCUMENTS

| | | | |
|---|---|---|---|
| 4,556,948 | 12/1985 | Mercy | 364/786 X |
| 4,737,926 | 4/1988 | Vo et al. | 364/787 |
| 4,764,887 | 8/1988 | Lai et al. | 364/787 |
| 5,146,424 | 9/1992 | Peterson et al. | 364/786 |

OTHER PUBLICATIONS

Computer Arithmetic, Chapter A.8 Speeding Up Integer Addition, "Carry Lookahead", pp. A-32 to A-37.

*Primary Examiner*—Tan V. Mai
*Attorney, Agent, or Firm*—Andrew S. Viger; John Maxin

[57] ABSTRACT

A carry skip adder uses independent paths for propagating a skip carry bit and a carry-in bit. Propagation of the carry-in bit is inhibited during a first portion of the clock cycle to prevent spurious carry-in signals from affecting the operation. During this period, other logic functions may be performed, including calculation of the propagation bits and generate bits for each adder block.

18 Claims, 3 Drawing Sheets

CARRY SKIP ADDER WITH INDEPENDENT CARRY-IN AND CARRY SKIP PATHS

TECHNICAL FIELD OF THE INVENTION

The invention relates generally to digital circuits, and more particularly relates to carry-skip adders, such as are used in microprocessor designs. In even greater particularity, the invention relates to a carry-skip adder that does not require precharging the adder inputs prior to each addition operation.

BACKGROUND OF THE INVENTION

Adder logic to perform integer addition is a basic building block of microprocessor design-adders are central to ALU design, but have numerous other uses such as address calculations and program counter incrementing. Optimizing the speed of addition operations commonly involves implementing in place of a simple carry-ripple adder one of three adder designs: carry lookahead, carry-select, or carry-skip.

Without limiting the scope of the invention, this background information is provided in the context of a specific problem to which the invention has application: for use in a microprocessor, a carry-skip adder design in which addition operations do not require precharging to clear the carry-in inputs, allowing adder operations to be completed in a single clock cycle.

The operation of a carry-skip adder is described in Section 1 of the Detailed Description. Basically, this type of adder is formed by a number of carry-ripple blocks, each receiving as inputs a plurality of addend-/augend bits to be summed along with a carry-in, and performing a full-ripple carry addition to provide (a) corresponding sum outputs with a ripple carry-out, as well as (b) an associated propagate value. An addition operation is accomplished in two stages: (a) in the first stage, each carry-ripple block performs a full ripple carry addition with an associated carry-skip operation to set up the carry-in inputs for each block after the first, and (b) in the second stage, each block performs a second full ripple carry addition with the carry-in inputs to obtain the final sum.

Proper operation of a carry-skip adder requires that prior to performing the first stage full ripple carry addition, all carry-in inputs to each stage must be cleared. Otherwise, under certain boundary conditions, the carry-skip operation will be negated, and the adder will revert to full carry-ripple operation (with the attendant performance degradation).

One common way to ensure that the carry-in inputs are initially cleared is to precharge the inputs to the adder. However, precharging is disadvantageous in that it prevents the addition operation from being performed in a single CPU clock cycle. That is, if the adder inputs are precharged during a first clock phase, then both stages of the carry-skip addition operation cannot be completed in the second clock phase.

Accordingly, a specific object of the invention is to provide an improved carry-skip adder design that does not rely on precharging to clear the carry-in inputs, thereby permitting an addition operation to be completed in one clock cycle.

SUMMARY OF THE INVENTION

The invention is a carry-skip adder with independent carry-in and carry-skip paths. The adder includes a cascade of ripple carry blocks each receiving respective carry-in and addend/augend inputs and performing a carry ripple addition operation to output sum and carry-out values together with a propagate signal.

In one aspect of the invention, the carry-skip adder comprises a plurality of cascaded carry-skip circuits defining a carry-skip path, each associated with one of the ripple carry blocks. Each carry-skip circuit receives a carry-out value from its associated ripple carry block and a propagate signal (which may be generated internally or received from the ripple carry blocks), and outputs: (a) during a first time period, a carry-skip signal to the next carry-skip circuit, and (b) during a second time period, a carry-in value for the next ripple carry block.

During the first time period, each ripple carry block performs a ripple carry addition operation, including outputting a carry-out value and a propagate value, and each carry-skip circuit outputs a carry-skip signal to the next carry-skip circuit. During the second time period, each carry-skip circuit provides a carry-in value to the next ripple carry block. In response to the receipt of a carry-in value from a carry-skip circuit, the ripple carry blocks complete the addition operation. Thus, the carry-skip propagates in the first time period, and the addition operation completes in the second time period.

In an exemplary embodiment, each carry-skip circuit receives a clock input. During the first clock phase, the carry-skip signals are propagated, and during the second clock phase, the carry-skip circuits output the carry-in values for the next ripple carry block (which then resolve to provide final sum outputs). This operation allows the carry-skip addition operation to complete in one clock period.

The technical advantages of the invention include the following. The carry-skip adder design avoids the need to precharge the adder inputs to ensure that the carry-in inputs to the ripple carry blocks are cleared prior to commencing an addition operation. By avoiding precharging, an addition operation can be completed in a single clock cycle: carry-skip operations resolve in the first clock phase, and the ripple carry addition operations (including skip carries) resolve in the second clock phase.

For a more complete understanding of the invention, and for further features and advantages, reference is now made to the Detailed Description of an exemplary embodiment of the invention—together with the accompanying Drawings, it being understood that the invention encompasses any modifications or alternative embodiments that fall within the scope of the claims.

DETAILED DESCRIPTION OF THE INVENTION

The detailed description of an exemplary embodiment of the carry-skip adder of the present invention is organized as follows:

1. Carry-Skip Adder
  1.1 Carry-Skip Adder Logic
  1.2 Carry-Skip Circuit
2. Carry-Skip Adder with Independent Carry-Skip Paths
3. Conclusion This organizational table, and the corresponding headings used in this detailed description, are provided for convenience of reference only.

The exemplary carry-skip adder is used in implementing the execution unit of a microprocessor. Additional exemplary uses on the microprocessor include the prefetch unit, misalignment logic, instruction pointer and debug logic. Detailed description of conventional or known aspects of microprocessor systems or carry-skip adders are omitted so as to not obscure the description of the invention with unnecessary detail.

1. CARRY-SKIP ADDER

Carry-Skip adders have been used in the prior art for many years. A carry-skip adder is midway in complexity between a ripple-carry adder and a carry-lookahead adder. Similarly, the carry-skip adder's speed is midway between a ripple-carry adder and a carry-lookahead adder. A carry-skip adder is a good choice whenever moderate speed is required in a relatively small area.

1.1 CARRY-SKIP ADDER LOGIC

The logic for a carry-skip adder is derived from the logic for a carry-lookahead adder. The formula to derive the ith sum bit (using a preceding "!" to indicated to indicate an inverted term) is:

$$s_i = a_i!b_i!c_i + !a_ib_i!c_i + !a_i!b_ic_i + a_ib_ic_i$$

where $s_i$ is the sum
$a_i$ and $b_i$ are the addend/augend inputs; and
$c_i$ is the carry in to the ith bit
The carry bit into the next bit ($c_{i+1}$) can be described in terms of a propagate bit, $p_i$, and a generate bit, $g_i$:

$$c_{i+1} = g_i + p_ic_i$$

$$g_i = a_ib_i$$

$$p_i = a_i + b_i$$

If $g_i$ is true ($g_i = 1$), then a carry will be generated for the next bit position. If $P_i$ is true, then a carry, if true, will be propagated to the next bit position.

A carry bit will be propagated from bit position i through bit position j if $P_i$, $P_j$, and all intermediate propagate terms are true. For example, a carry will propagate from bit position 5 though bit position 9 if:

$$P_{5,9} = p_5p_6p_7p_8p_9 = 1$$

Consequently, whether a carry bit will propagate through a block of sum bits can be easily determined. The carry-skip adder takes advantage of this property. Operation of a carry-skip adder is best described in connection with FIG. 1.

Figure 1:
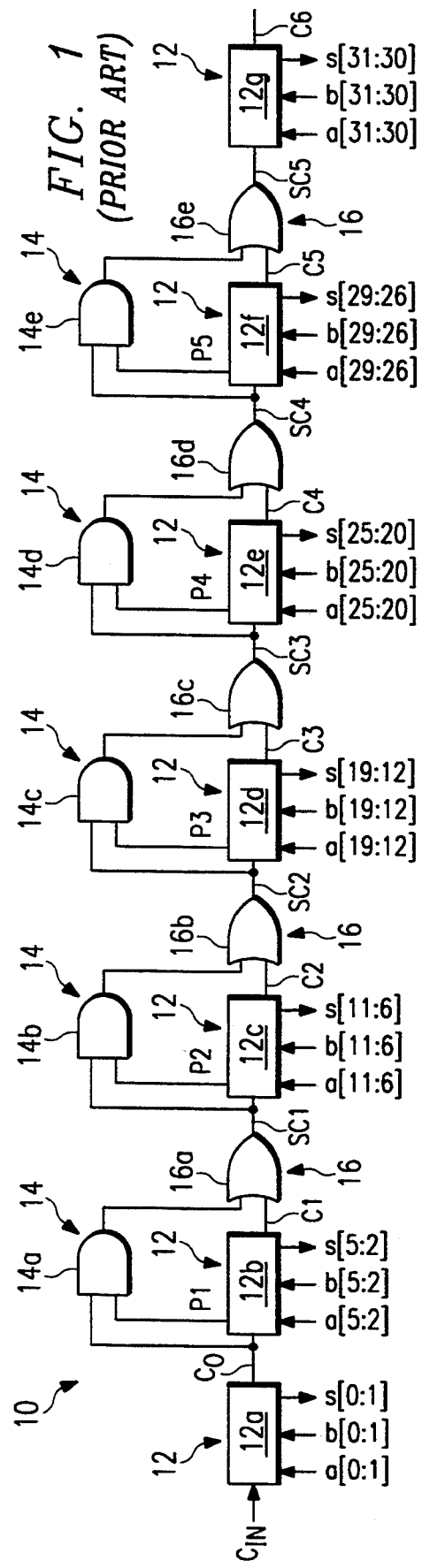
FIG. 1 illustrates a schematic representation of a prior art carry-skip adder circuit.

1.2 Carry-Skip Circuit. FIG. 1 illustrates a schematic representation of a common carry-skip architecture. The skip carry adder 10 comprises a plurality of adder blocks, generally referred to by reference numeral 12 and individually referred to as blocks 12a–g, coupled by AND gates 14 (individually 14a–e) and OR gates 16 (individually 16a–e). Each adder receives a plurality of input bits ($a_i$ and $b_i$) and outputs sum bits ($s_i$) and a P term defined above. Adder blocks 12a–g are different sizes to optimize the speed of the overall adder 10. AND gates 14 receive the output of a preceding OR gate 14 and the P term for the present block. The first AND gate 14a receives the ripple carry-out from the first adder block 12a, rather than the output of an OR gate 16. For example, AND gate 14a receives carry-out $C_O$ from adder block 12a and the P1 term (equal to $p_2p_3p_4p_5$) generated by adder block 12b. OR gates 16a–e receive the output of the respective AND gate 14a–e and the ripple carry-out of the preceding adder blocks 12b–f. The output of each OR gate is referred to as the skip-carry (SC) for the adder block. Hence, the output of OR gate 12a is denoted as SC1, as the skip-carry for adder block 12b.

In operation, each adder block 12a–g performs a ripple carry add. The P term can be easily and quickly computed. It is important to the operation of the circuit, however, that the carry-in (i.e., the SC signal) to each adder block 12 is zero at the start of each adder operation in order to prevent spurious carry-outs from the adder blocks. One popular method for clearing the carry-in signals is to precharge the adder inputs at the start of each operation during the first half of a clock cycle. This method, however, significantly slows the operation of the carry-skip adder.

2. CARRY-SKIP ADDER WITH INDEPENDENT SKIP CARRY PATHS

Figure 2:
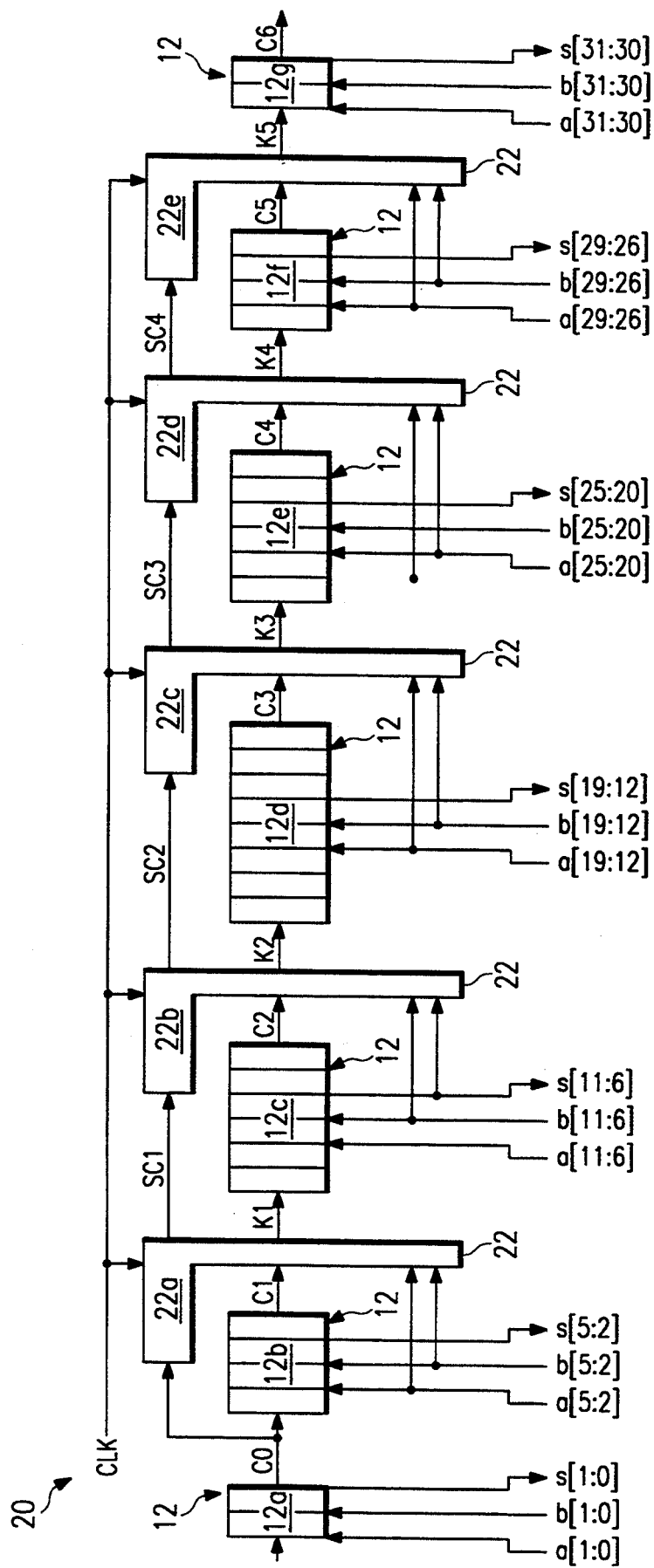
FIG. 2 illustrates a block diagram of a carry-skip adder according to the invention.

FIG. 2 illustrates a carry-skip adder which uses independent carry-in and skip-carry paths to enhance operation of the circuit. The skip carry adder 20 uses adder blocks 12a–g equivalent to those shown in FIG. 1. Each adder block 12 receives a and b inputs and outputs sum bits as described above. Logic blocks 22 (individually 22a–e) receive the a and b inputs and the carry-out from respective adder blocks along with a clock signal (clk) and the skip-carry (SC) term from the preceding block (the first logic block 22a receives the ripple carry-out $C_O$ from adder block 12a instead of a SC term). The logic blocks are more completely described in connection with Table 1 and FIG. 3.

TABLE 1

| Logic Block | Logic Block Functions SC | K |
|---|---|---|
| 22a | $SC1 = (P_1 \cdot C_0) + C_1$ | $K_1 = SC_1 \cdot !clk$ |
| 22b | $SC2 = (P_2 \cdot SC_1) + C_2$ | $K_2 = SC_2 \cdot !clk$ |
| 22c | $SC3 = (P_3 \cdot SC_2) + C_3$ | $K_3 = SC_3 \cdot !clk$ |
| 22d | $SC4 = (P_4 \cdot SC_3) + C_4$ | $K_4 = SC_4 \cdot !clk$ |
| 22e | $SC5 = (P_5 \cdot SC_4) + C_5$ | $K_5 = SC_5 \cdot !clk$ |

The description of the logic function of logic blocks 22 assumes that the clock is a logical high to initiate the add operation. Consequently, for the first half of the clock cycle, the K terms are set to a "0" to prevent any spurious carry-ins from propagating through the adder blocks 12. However, the other operations of the adder blocks may be executed in the first half of the clock cycle; i.e., the P term may be calculated and the carry-outs from the ripple adder blocks indicate whether a carry-out is generated from each block. Further, the SC terms will propagate through the logic blocks 22 during the first half of the clock cycle. Upon a high to low transition of the clock signal, all carry-ins (K terms) will be valid and will propagate through the ripple carry adder blocks 12 to complete the addition.

Figure 3:
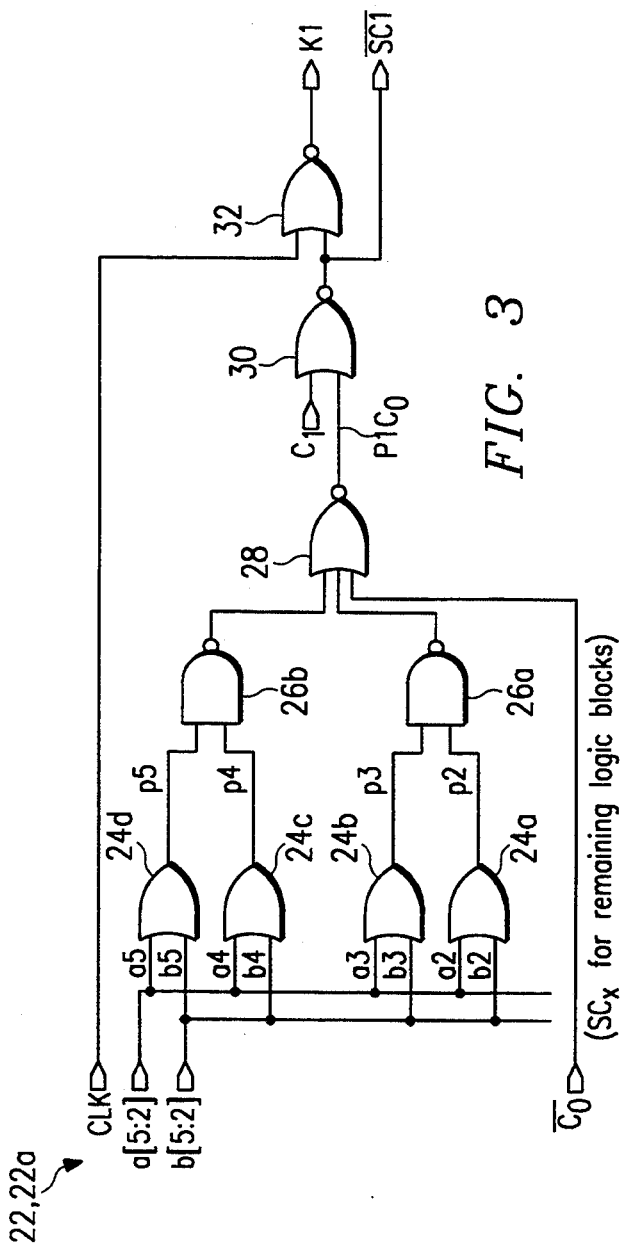
FIG. 3 illustrates a schematic diagram of a carry-skip logic circuit.

FIG. 3 illustrates a schematic representation of an exemplary circuit for implementing the logic for the logic blocks 22. This implementation uses NAND and NOR gates to implement substantial portions of the logic; other logic configurations could similarly be used to implement the functions set forth in Table 1. For illustrative purposes, logic block 22a is shown in FIG. 3. For the remaining logic blocks, the inputs would vary as described hereinbelow.

The logic blocks 22 comprise a plurality of OR gates 24 (individually 24a–d) which each receive respective add inputs $a_i$ and $b_i$. The output of each OR gate 24a–b is the respective propagate signal $p_i$. For example, OR gate 24a receives inputs $a_2$ and $b_2$ and outputs $p_2$. NAND gates 26 (individually 26a–b) receive pairs of the outputs from the OR gates 24a–b and 24c–d respectively. NOR gate 28 receives the outputs of the NAND gates 26a–b along with the inverted skip-carry (SC) from the previous logic block 22. As shown in FIG. 3, the first logic block 22a receives the ripple carry-out, $C_0$, of the previous adder block 12a, rather than the SC term of the previous logic block. The output of NOR gate 28 is equal to $P_1 C_0$ for the first logic block. The output of NOR gate 28 is an input to NOR gate 30 along with $C_1$, the ripple carry-out of the corresponding adder block. The output of NOR gate 30 is the inverted SC term for the logic block 22. The output of NOR gate 30 is input to NOR gate 32 along with a clock signal (clk) to generate the $K_1$ term, which is the carry-in to the next block.

Operation of subsequent logic blocks 22b–e is identical to that of logic block 22a, with the exception that the number of adder inputs will vary depending upon the size of the corresponding adder block 12, and the SC signal from the previous logic block will be input to NOR gate 28 rather than the $C_0$ signal. Hence, for subsequent logic blocks, the output of NOR gate 28 will be $P:SC_{i-1}$.

As can be seen from the schematic of FIG. 3, the P term for each adder block 12 may be calculated internally to the logic blocks 22; alternatively, the P term could be calculated in each adder block 12.

Figure 4:
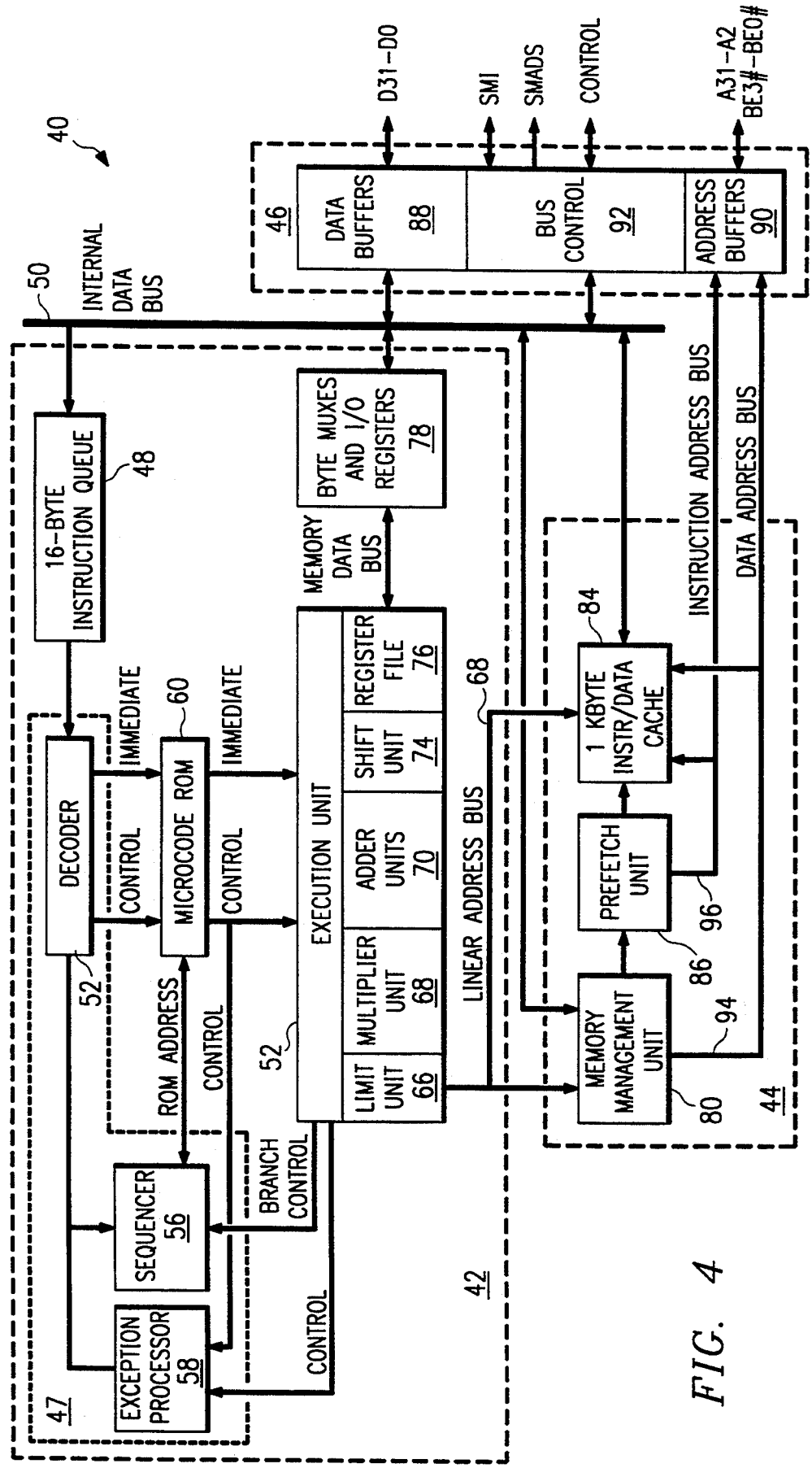
FIG. 4 illustrates a block diagram of a microprocessor core including a carry-skip adder according to the invention.

FIG. 4 illustrates a block diagram of the various subcircuits of a preferred embodiment of a microprocessor 40 which includes the adder 20 of the present invention, although the adder 20 may be used in any type of microprocessor architecture. For purposes of illustration, the microprocessor 40 will be described in connection with a microprocessor which is pin-compatible and instruction-compatible with the 80×86 family of processors by Intel Corporation, specifically the 80386/486 microprocessors. The microprocessor 40 comprises three main functional groups: the core circuit 42, the memory circuit 44, and the bus controller 46. The core circuitry 42 includes an instruction queue 48 coupled to an internal data bus 50. The output of the instruction queue 48 is coupled to a decoder 52 of the decode/sequence circuitry 54. The decode/sequence circuitry 54 also includes a sequencer 56 and an exception processor 58. The decoder 52 is coupled to a microcode ROM 50, exception processor 58 and sequencer 62. The sequencer 62 is also coupled to the microcode ROM 60 and to an execution unit 64. The execution unit includes a limit unit 66, a multiplier unit 68, adder units 70, a shift unit 74, and a register file 76. The execution unit 64 is coupled to the microcode ROM 60 and to multiplexer and I/O register circuitry 78. The memory circuitry 44 comprises a memory management unit 80 coupled to a linear address bus 82 which is also connected to the execution unit 64 and an instruction/data cache memory 84. Memory management unit 80 is further coupled to the internal data bus 50. A prefetch unit 86 is coupled between the memory management unit 80 and the cache 84. Bus controller 46 includes data buffers 88, address buffers 90 and control circuitry 92. The data buffers 88 are coupled to the data I/O pins D31-D0, the address buffers 90 are coupled to the address pins A31-A2 and BE3#-BE0#. A data address bus 94 couples the memory management unit 80, the cache 84 and the address buffer 88. An instruction address bus 96 couples the prefetch unit 86, cache 84 and address buffer 88. The data buffers 86 are coupled to the internal data bus 50.

In the illustrated embodiment, adder units 70 include one or more high speed adders using a faster architecture, such as a Ling architecture along with the carry-skip adder described above in connection with FIGS. 2 and 3. The carry-skip adder may be used for a variety of purposes where high speed is not a necessity, such as address calculations and program counter incrementing. While the adder shown in FIGS. 2 and 3 is described as a two-input adder, it can be easily changed to a three-input adder by using a preliminary carry-save adder stage to provide a three-input to two-input translation, as is well known in the art.

3. CONCLUSION

Although the Detailed Description of the invention has been directed to certain exemplary embodiments, various modifications of these embodiments, as well as alternative embodiments, will be suggested to those skilled in the art. For example, the invention has general applicability to carry-skip adders, and the particular design of the carry-skip adder, including the selection of the number and length of the ripple blocks, is a routine implementation detail.

The invention encompasses any modifications or alternative embodiments that fall within the scope of the claims.

What is claimed is:

1. A carry-skip adder comprising:
   (a) a plurality of adder blocks cascaded to form a ripple carry path, each adder block having inputs coupled to receive addend, augend, and carry-in bits, and having a plurality of outputs providing a summation of the addend and augend bits and a carry-out bit;
   (b) a plurality of logic blocks cascaded together and respectively coupled across the plurality of cascaded adder blocks to form a carry-skip path, each logic block having a plurality of inputs coupled to receive from a respective adder block, a clock signal, the addend and augend bits, and the carry-out bit, and a carry-skip output bit from a preceding logic block; and
   (c) during a first phase of the clock signal, each logic block providing a carry-skip output bit to a carry-skip input on a subsequent cascaded logic block and during a second phase of the clock signal, each logic block providing a carry-out output bit to the carry-in bit input on a subsequent adder block.

2. A carry-skip adder as recited in claim 1 wherein the logic block comprises:
   (i) means for resolving the carry-skip output bit according to:

$SC_{+1} = (P.SC) + C$; and (ii) means for resolving the carry-out output bit according to:

$$K = SC_{+1} \cdot !CLK;$$

wherein $SC_{+1}$ is the carry-skip output bit,
P is a product of a sum of the addend and augend bits,
SC is the skip-carry output bit from a preceding logic block,
C is the carry-out bit of the respective adder block,
K is the carry-out output bit which is coupled to the carry-in bit of the subsequent adder block,
! indicates an inverted term, and
CLK is the clock signal.

3. A carry-skip adder as recited in claim 1 wherein the logic block comprises:
   (i) a plurality of OR gates having inputs coupled to receive the addend and augend bits;
   (ii) a plurality of NAND gates having inputs coupled to receive outputs from the OR gates;
   (iii) a first NOR gate having inputs coupled to receive outputs from the plurality of NAND gates and to receive the carry-skip output bit from the preceding logic block;
   (iv) a second NOR gate having a first input coupled to receive an output from the first NOR gate and a second input coupled to receive the carry-out bit from the respective adder block; and
   (v) a third NOR gate having a first input coupled to receive an output from the second NOR gate, a second input coupled to receive the clock signal, and an output for providing the carry-out output bit.

4. A carry-skip adder as recited in claim 1 wherein the adder blocks are ripple carry adders.

5. A carry-skip adder as recited in claim 4 wherein at least one of the plurality of cascaded ripple-carry adders has a different width for summing a different number of addend and augend bits.

6. A carry-skip adder as recited in claim 1 further comprising a carry-save adder stage coupled between the addend and augend bits and the adder block inputs for providing a three-to-two input translation.

7. A carry-skip adder comprising:
   (a) summing means, defining a ripple carry path, for summing a plurality of addend, augend, and carry-in bits and providing a plurality of summation bits and at least one carry-out bit:
   (b) carry skip means including a plurality of cascaded stages, coupled across the summing means and defining a carry-skip path, responsive to the summation bits, the at least one carry-out bit, a clock signal, and a carry-skip output bit, for generating at least one carry-skip bit
   (c) during a first phase of the clock signal, the carry skip means providing a carry-skip output bit to a carry-skip input on a subsequent cascaded stage and during a second phase of the clock signal, the carry skip means providing a carry-out output bit to the carry-in bit input on a subsequent stage.

8. A carry-skip adder as recited in claim 7 wherein the summing means comprises a plurality of cascaded ripple-carry adders.

9. A carry-skip adder as recited in claim 8 wherein at least one of the plurality of cascaded ripple-carry adders has a different width for summing a different number of addend and augend bits.

10. A carry-skip adder as recited in claim 7 wherein the carry skip means (b) generates:

$$SC_{+1} = (P \cdot SC) + C; \text{ and}$$

$$K = SC_{+1} \cdot !CLK$$

wherein $SC_{+1}$ is the carry-skip bit,
P is a product of a sum of the plurality of addend and augend bits,
SC is a skip-carry bit from a preceding stage in the independent carry-skip path,
C is the carry-out bit from the means for summing,
K is the secondary carry-out bit,
! indicates an inverted term, and
CLK is a clock signal.

11. A carry-skip adder as recited in claim 7 further comprising translation means for providing a three-input to two-input translation for the addend and augend bits into the means for summing.

12. A method for performing a carry-skip operation comprising the steps of:
   (a) initiating a ripple carry addition in a first clock phase;
   (b) propagating a carry-skip signal in the first clock phase; and
   (c) resolving in a second clock phase, the ripple carry addition initiated in step (a) including propagating a carry-out signal in response to the carry-skip signal propagated in step (b).

13. A method as recited in claim 12 wherein step (b) comprises the steps of:
   (i) logically ANDing a sum of addend and augend bits: and
   (ii) logically ORing a carry-out bit from the ripple carry addition in step (a).

14. A method as recited in claim 12 wherein the carry-out signal in step (c) is generated according to the step of logically ANDing the carry-skip signal with an inversion of the clock signal.

15. A microprocessor having core circuitry employing at least one carry-skip adder, the carry skip adder comprising:
   (a) a plurality of adder blocks cascaded to form a ripple carry path, each adder block having inputs coupled to receive addend, augend, and carry-in bits, and having a plurality of outputs providing a summation of the addend and augend bits and a carry-out bit;
   (b) a plurality of logic blocks cascaded together and respectively coupled across the plurality of cascaded adder blocks to form a carry-skip path, each logic block having a plurality of inputs coupled to receive from a respective adder block, a clock signal, the addend and augend bits, and the carry-out bit, and a carry-skip output bit from a preceding logic block; and
   (c) during a first phase of the clock signal, each logic block providing a carry skip output bit to a carry-skip input on a subsequent cascaded logic block and during a second phase of the clock signal, each logic block providing a carry-out output bit to the carry-in bit input on a subsequent adder block.

16. A microprocessor as recited in claim 15 wherein the logic block comprises:
   (i) means for resolving the carry-skip output bit according to:

$$SC_{+1} = (P \cdot SC) + C; \text{ and}$$

(ii) means for resolving the carry-out output bit according to:

$$K = SC_{+1} \cdot !CLK;$$

wherein $SC_{+1}$ is the carry-skip output bit,

P is a product of a sum of the addend and augend bits,

SC is the skip-carry output bit from a preceding logic block,

C is the carry-out bit of the respective adder block,

K is the carry-out output bit which is coupled to the carry-in bit of the subsequent adder block, ! indicates an inverted term, and CLK is the clock signal.

17. A microprocessor as recited in claim 15 wherein the logic block comprises:

(i) a plurality of OR gates having inputs coupled to receive the addend and augend bits;

(ii) a plurality of NAND gates having inputs coupled to receive outputs from the OR gates;

(iii) a first NOR gate having inputs coupled to receive outputs from the plurality of NAND gates and to receive the carry-skip output bit from the preceding logic block;

(iv) a second NOR gate having a first input coupled to receive an output from the first NOR gate and a second input coupled to receive the carry-out bit from the respective adder block; and (v) a third NOR gate having a first input coupled to receive an output from the second NOR gate, a second input coupled to receive the clock signal, and an output for providing the carry-out output bit.

18. A microprocessor as recited in claim 15 wherein at least one adder block has a different width for adding a different number of addend and augend bits.

* * * * *